(12) United States Patent
Klosinski et al.

(10) Patent No.: US 8,015,882 B2
(45) Date of Patent: Sep. 13, 2011

(54) INDUSTRIAL PROCESS CONTROL PRESSURE TRANSMITTER AND FLANGE COUPLING

(75) Inventors: Andrew J. Klosinski, Waconia, MN (US); David A. Broden, Andover, MN (US); Fred C. Sittler, Excelsior, MN (US)

(73) Assignee: Rosemount Inc., Eden Prairie, MN (US)

( * ) Notice: Subject to any disclaimer, the term of this patent is extended or adjusted under 35 U.S.C. 154(b) by 211 days.

(21) Appl. No.: 12/478,174

(22) Filed: Jun. 4, 2009

(65) Prior Publication Data

US 2010/0307254 A1 Dec. 9, 2010

(51) Int. Cl.
*G01L 7/00* (2006.01)

(52) U.S. Cl. ........................................ 73/756

(58) Field of Classification Search .............. 73/706, 73/756, 700
See application file for complete search history.

(56) References Cited

U.S. PATENT DOCUMENTS

| | | | |
|---|---|---|---|
| 2,871,881 A | 2/1959 | Hewson | 137/597 |
| 3,319,468 A | 5/1967 | Baumann | 73/407 |
| 3,468,561 A | 9/1969 | Balitsky et al. | 285/23 |
| 3,817,283 A | 6/1974 | Hewson | 137/608 |
| 3,974,855 A | 8/1976 | Webb | 137/527 |
| 4,005,848 A | 2/1977 | Eggleston | 251/173 |
| 4,046,010 A | 9/1977 | Akeley | 73/406 |
| 4,182,362 A | 1/1980 | Hewson et al. | 137/340 |
| 4,193,420 A | 3/1980 | Hewson | 137/356 |
| 4,231,546 A | 11/1980 | Eggleston et al. | 251/173 |
| 4,319,492 A | 3/1982 | Hewson et al. | 73/756 |
| 4,466,290 A | 8/1984 | Frick | 73/756 |
| 4,562,742 A | 1/1986 | Bell | 73/718 |
| 4,609,046 A | 9/1986 | Schawann et al. | 285/24 |
| 4,738,276 A | 4/1988 | Adams | 137/343 |
| 4,745,810 A | 5/1988 | Pierce et al. | 73/756 |
| 4,798,089 A | 1/1989 | Frick et al. | 73/706 |
| 4,833,922 A | 5/1989 | Frick et al. | 73/756 |
| 4,920,626 A | 5/1990 | Nimberger | 285/219 |
| 4,932,836 A | 6/1990 | Boster | 285/24 |
| 4,993,754 A | 2/1991 | Templin, Jr. | 285/189 |
| 5,083,586 A | 1/1992 | Akamatsu | 137/343 |
| 5,094,109 A | 3/1992 | Dean et al. | 73/718 |

(Continued)

FOREIGN PATENT DOCUMENTS

DE 1 259 600 1/1968

(Continued)

OTHER PUBLICATIONS

Search Report and Written Opinion from corresponding Application No. PCT/US2010/037162, dated Nov. 26, 2010.

*Primary Examiner* — Jewel Thompson
(74) *Attorney, Agent, or Firm* — Westman, Champlin & Kelly, P.A.

(57) ABSTRACT

A pressure transmitter for measuring a pressure of a process fluid in an industrial process, includes a pressure sensor having an output related to an applied pressure. Measurement circuitry coupled to the pressure sensor is configured to provide a transmitter output related to sensed pressure. A pressure coupling face having an opening therein is arranged to transfer the applied pressure to the pressure sensor. A pressure coupling flange having a flange face abutting the pressure coupling face is configured to convey the process fluid to the opening of the pressure coupling face. Features are provided to control distribution of a leading force across the pressure coupling face and the flange face.

40 Claims, 5 Drawing Sheets

U.S. PATENT DOCUMENTS

| | | | |
|---|---|---|---|
| 5,095,755 A | 3/1992 | Peterson | 73/706 |
| 5,184,514 A | 2/1993 | Cucci et al. | 73/706 |
| 5,248,167 A | 9/1993 | Petrich et al. | 285/23 |
| 5,427,358 A | 6/1995 | Eggleston et al. | 251/367 |
| 5,487,527 A | 1/1996 | Eggleston | 251/62 |
| 5,524,492 A | 6/1996 | Frick et al. | 73/706 |
| 5,922,965 A * | 7/1999 | Behm et al. | 73/706 |
| 5,955,675 A | 9/1999 | Peterson | 73/706 |
| 6,038,961 A | 3/2000 | Filippi et al. | 92/98 |
| 6,055,863 A | 5/2000 | Behm et al. | 73/706 |
| 6,059,254 A | 5/2000 | Sundet et al. | 248/678 |
| 6,539,808 B2 | 4/2003 | Saenz et al. | 73/756 |
| 7,080,558 B2 * | 7/2006 | Broden et al. | 73/706 |
| 7,117,745 B2 * | 10/2006 | Broden | 73/706 |
| 2005/0092093 A1 | 5/2005 | Kang et al. | 73/700 |
| 2007/0193359 A1 | 8/2007 | Asada et al. | 73/754 |

FOREIGN PATENT DOCUMENTS

| | | |
|---|---|---|
| DE | 2424839 | 12/1975 |
| EP | 0 403 256 A2 | 12/1990 |
| JP | 59-57134 | 4/1984 |
| JP | 2280026 | 11/1990 |

\* cited by examiner

INDUSTRIAL PROCESS CONTROL PRESSURE TRANSMITTER AND FLANGE COUPLING

BACKGROUND OF THE INVENTION

The present invention relates to industrial process pressure transmitters. More specifically, the present invention relates to coupling of the pressure transmitter to a process fluid of an industrial process.

Industrial process control systems are used to monitor and control industrial processes used to produce or transfer fluids or the like. In such systems, it is typically important to measure "process variables" such as temperatures, pressures, flow rates, and others. Process control transmitters are used to measure such process variables and transmit information related to the measured process variable back to a central location such as a central control room.

One type of process variable transmitter is a pressure transmitter which measures pressure of a process fluid and provides an output related to the measured pressure. This output may be a pressure, a flow rate, a level of process fluid, or other process variable. The transmitter is configured to transmit information related to the measured pressure back to a central control room. The transmission is typically over a two wire process control loop, however, other communication techniques may be used including wireless techniques.

The pressure transmitter must be coupled to a process fluid through a process coupling. For example, the process fluid can comprise a component used in an industrial process such as natural gas, oil, etc. Some of these materials may be under extremely high pressures. These high pressures can lead to leakage between the pressure transmitter and the industrial process through the "flange" or fitting which is used to couple to the pressure transmitter to the process.

There is an ongoing need for improved coupling between a pressure transmitter and a process fluid.

SUMMARY

A pressure transmitter for measuring a pressure of a process fluid in an industrial process, includes a pressure sensor having an output related to an applied pressure. Measurement circuitry coupled to the pressure sensor is configured to provide a transmitter output related to sensed pressure. A pressure coupling face having an opening therein is arranged to transfer the applied pressure to the pressure sensor. A pressure coupling flange having a flange face abutting the pressure coupling face is configured to convey the process fluid to the opening of the pressure coupling face. Features are provided to control distribution of a leading force across the pressure coupling face and the flange face.

DETAILED DESCRIPTION

As discussed in the Background section, there is an ongoing need for an improved coupling between a pressure transmitter and the process fluid. Under some conditions, the coupling between the pressure transmitter and the process fluid is insufficient for the operating conditions which can result in leakage of the process fluid. In a pressure transmitter, a typical arrangement for coupling the transmitter to the fluid utilizes a flange into which piping is threaded. The piping couples to the process fluid for example to a process pipe. The flange provides a substantially flat interface onto which the pressure transmitter is bolted. However, it has been discovered that in a typical installation, the bolting force is spread in an inconsistent manner across the flange face. This can allow, under certain conditions, process fluid to leak between the interface of the flange with the pressure transmitter.

The present invention addresses this leakage of process fluid by providing a flange and/or transmitter configuration which is curved or otherwise protrudes in an outwardly manner, i.e., in the direction of a mounting force. As the mounting force is applied between the flange and the transmitter, the protrusion causes the flange/transmitter interface to bend in a manner which more evenly spreads the mounting force across a wider area. By more evenly spreading the mounting force across a wider area, an improved seal is provided between the flange and the process transmitter. This improved seal reduces the potential for leakage between the pressure transmitter and the flange.

Figure 1:
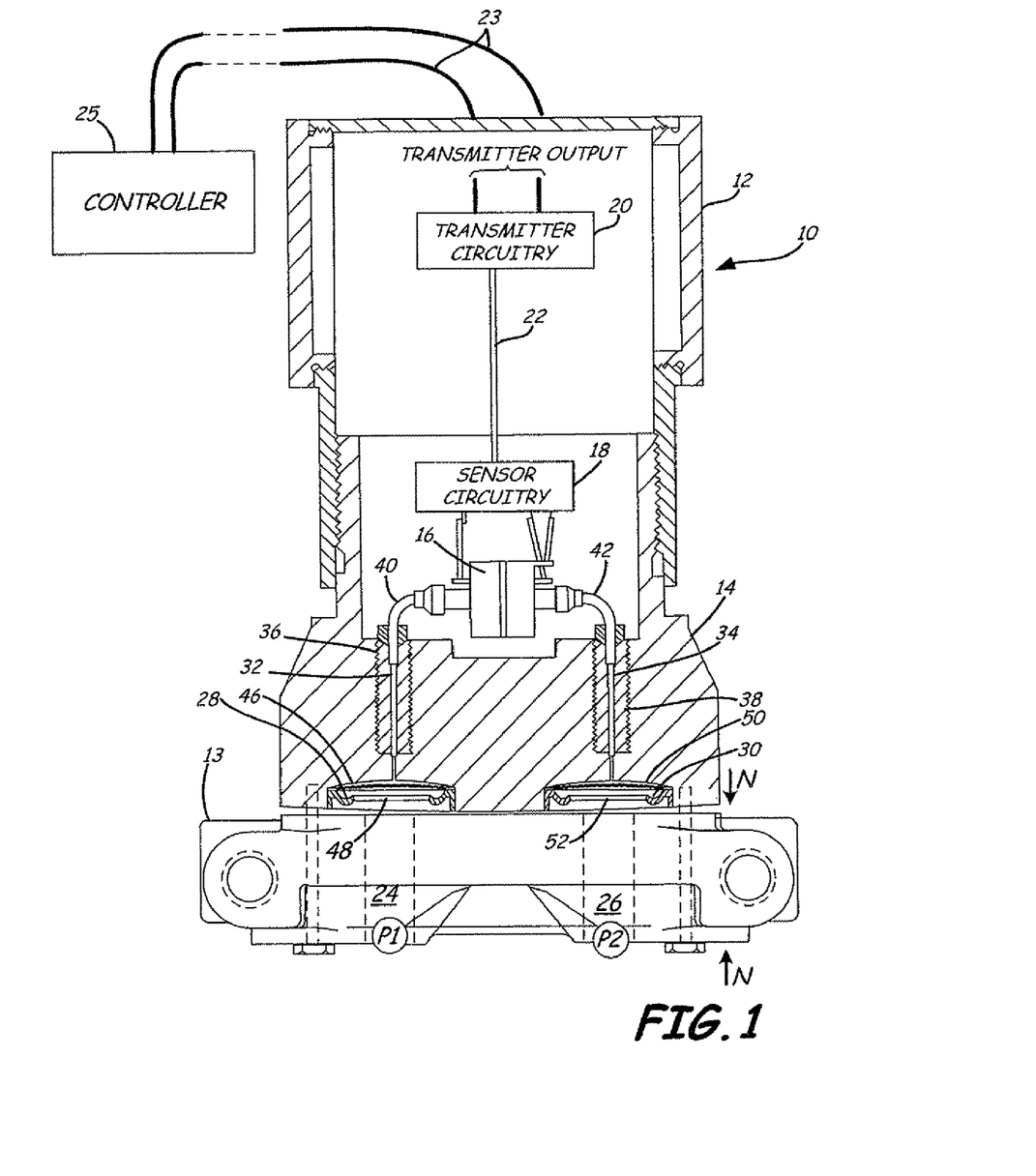
FIG. 1 is a cross-sectional view of a transmitter and flange in accordance with the present invention.

FIG. 1 shows an exemplary pressure transmitter 10 having transmitter housing 12, coupling flange or manifold 13 and sensor body 14 in accordance with the present invention. Although the present invention is shown with a Coplanar™ flange, the invention may be used with any type of flange, manifold, or other coupling adapted to receive process fluid. Sensor body 14 includes pressure sensor 16, and transmitter housing 12 includes transmitter circuitry 20. Sensor circuitry 18 is coupled to transmitter circuitry 20 through communication bus 22. Transmitter circuitry 20 sends information related to pressure of the process fluid over a communication link such as a two wire process control loop 23 (or circuit). The transmitter 10 may optionally be wholly powered over the control loop 23 by a controller 25. Other communication techniques may also be used including wireless techniques.

In this example embodiment of a transmitter, pressure sensor 16 measures a difference in pressure between pressure P1 in passageway 24 and pressure P2 in passageway 26 of flange 13. Pressure P1 is coupled to sensor 16 through passageway 32. Pressure P2 is coupled to sensor 16 through passageway 34. Passageway 32 extends through coupling 36 and tube 40. Passageway 34 extends through coupling 38 and tube 42. Passageways 32 and 34 are filled with a relatively incompressible fluid such as oil. Couplings 36 and 38 are attached to sensor body 14 and provide a long flame-quenching path between the interior of the sensor body carrying sensor circuitry 18 and process fluid contained in passageways 24 and 26.

Passageway 24 is positioned adjacent to opening 28 in sensor body 14. Passageway 26 is positioned adjacent to opening 30 in sensor body 14. Diaphragm 46 is positioned in opening 28 and is coupled to sensor body 14 adjacent to passageway 24. Passageway 32 extends through coupling 36 and sensor body 14 to diaphragm 46. Diaphragm 50 is coupled to sensor body 14 adjacent to passageway 26. Passageway 34 extends through coupling 38 and sensor body 14 to diaphragm 50.

In operation, flange 13 presses against seals 48 and 52 when transmitter 10 is bolted to flange 13 due to the applied mounting force N as shown in FIG. 1. Seal 48 is seated on sensor body 14 adjacent to opening 24 and diaphragm 46, and prevents process fluid leakage from passageway 24 and opening 28 past flange 13 to the outside environment. Similarly, seal 52 is coupled to sensor body 14 adjacent to opening 26 and diaphragm 50, and prevents process fluid leakage from passageway 26 and opening 30 past flange 13 to the outside environment. As discussed below in greater detail, at least one of a pressure coupling face 60 of sensor body 14 or a flange face 62 of flange 13 (see FIGS. 2-4) is curved or otherwise protrudes in the direction of the mounting force.

Figure 2:
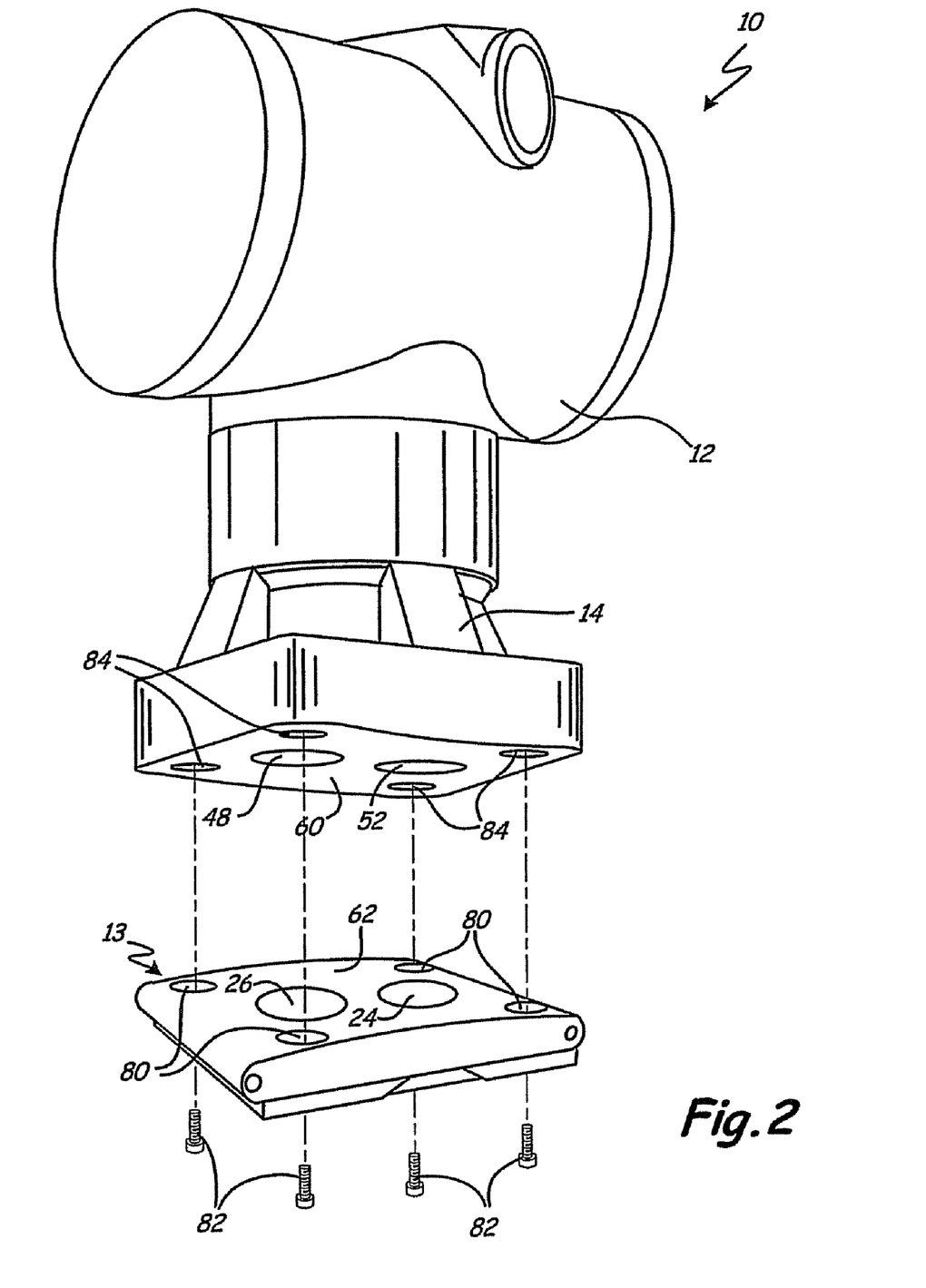
FIG. 2 is a exploded perspective view of the transmitter and flange of FIG. 1.

FIG. 2 shows an exploded perspective view of transmitter 10 and flange 13 in accordance with one example embodiment. In the embodiment of FIG. 2, the flange 13 is shown as having a two-dimensional curvature in which flange face 62 is curved along one axis of the flange 13. FIG. 2 shows the flange 13 and transmitter 10 in a "unloaded" condition in which no mounting force is applied therebetween. However, when installed, the flange 13 is mounted to the sensor body 14 through mounting bolts 82 which extend through mounting holes 80 of flange 13 and are threadably received in bolt holes 84 of the sensor body 14. This causes the mounting force N shown in FIG. 1 to be applied between faces 60 and 62. Although FIG. 2 illustrates four mounting bolts, any number or configuration may be used. Further, other attachment techniques may be employed to mount the flange 13 to the sensor body 14 and thereby "load" flange 13 and sensor body 14. The geometry of the flange face 62 will improve the distribution of the clamping force applied by the bolts 82 at the four corners of the flange 13. The configuration serves as a spring element and adds to the bolt pre-loading. Once the loading force is applied, the flange face 62 and the pressure coupling face 60 will tend to conform to one another and form a substantially continuous surface such as illustrated in FIG. 1. The interface may be substantially flat, or may have some other profile.

Figure 3:
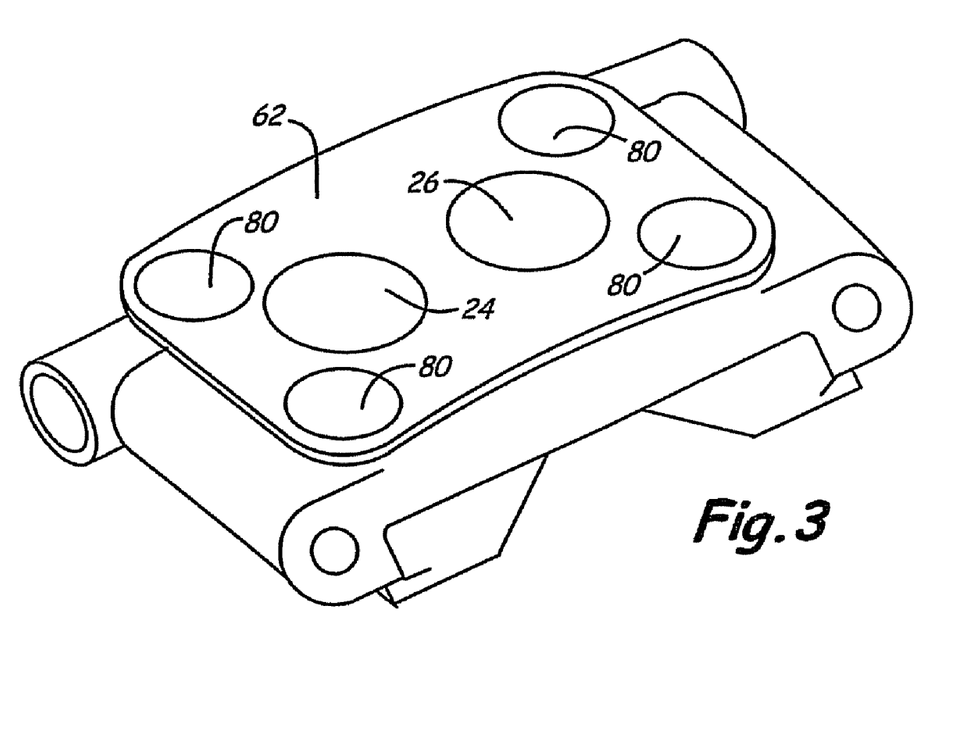
FIG. 3 is a perspective view of a flange in accordance with another example embodiment.

FIG. 3 is a perspective view of another example embodiment of flange 13 in which the curve of flange face 62 is three dimensional. In this example, the curvature has a spherical shape which is spread across the entire surface of flange face 62. This configuration also serves to more uniformly distribute the clamping force. However, in this configuration, the mounting force is more evenly distributed along both axes of the flange face 62. As illustrated in FIG. 3, the flange 13 is in an unloaded state. When a sufficiently larger load force (mounting force) is applied against the sensor body 14, the interface between faces 60 and 62 will be substantially continuous as shown in FIG. 1. In the configuration shown in FIG. 2, the pressure coupling face 60 of pressure transmitter 10 may also be configured to have a curved profile. This may be separate from, or in addition to, the curvature of flange 13.

Figure 4:
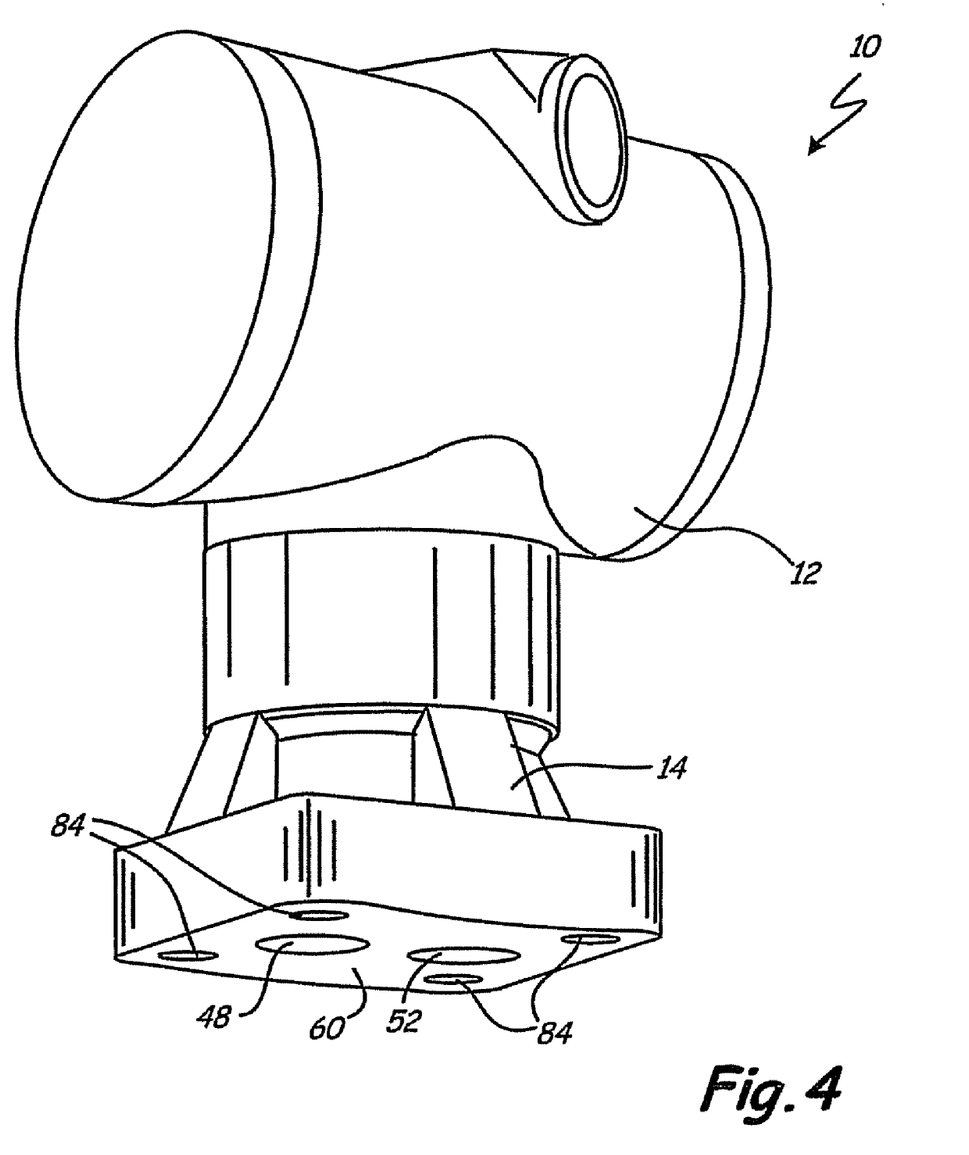
FIG. 4 is a bottom perspective view of a pressure coupling face of the transmitter in accordance with another example embodiment.

FIG. 4 is a bottom perspective view of transmitter 10 showing such a configuration in which pressure coupling face 60 is curved. When the flange 13 is sufficiently loaded against face 60, the faces 60 and 62 will conform and provide a continuous surface such as that shown in FIG. 2. Note that if only face 60 is curved, the profile of the flange face 62 in a loaded condition will tend to also be curved and conform to face 60. This is because flange 13 may be less stiff than sensor body 14, such that face 60 will tend to maintain its original shape while face 62 will tend to bend to the profile of face 60.

Figure 5:
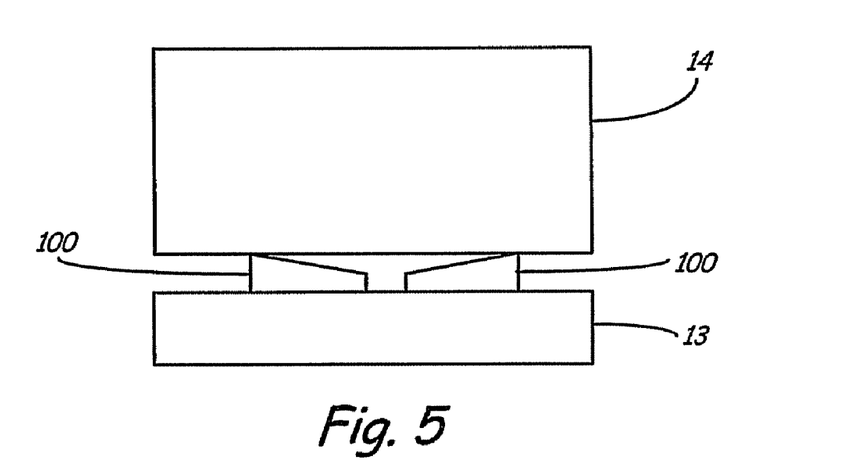
FIG. 5 is a side plan view of an example embodiment showing a gasket or seal in accordance with the present invention.
Figure 6:
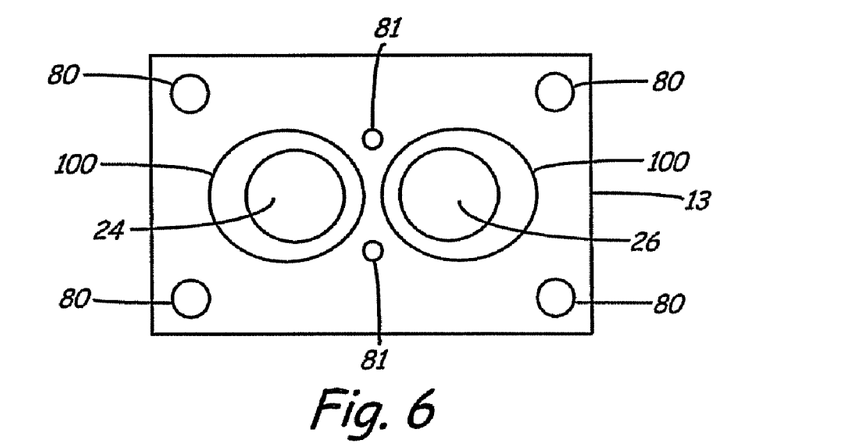
FIG. 6 is a top plan view of a flange showing a gasket or seal having a variable area.

FIG. 5 is side plan and top plan views of another example embodiment of the present invention. In FIG. 5, a beveled seal 100 is positioned between the flange 13 and the sensor body 14. The beveled seals 100 extend around openings 24 and 26, shown in FIG. 6. The seals 24 and 26 can be a conventional seal or can comprise, for example, a "confined gasket" in which materials such as PTFE is held in a groove. Also shown in FIG. 6 are additional mounting holes 81 positioned near a central region of the flange 13. In a similar approach shown in FIG. 6, the seal or gasket 100 has an area which is variable about the openings 24 and 26. This variation in area causes the loading force to be spread as desired. In another example embodiment, the gasket or seal 100 is uniform however a groove into which it is placed has a variable depth to achieve a desired load distribution.

Figure 7:
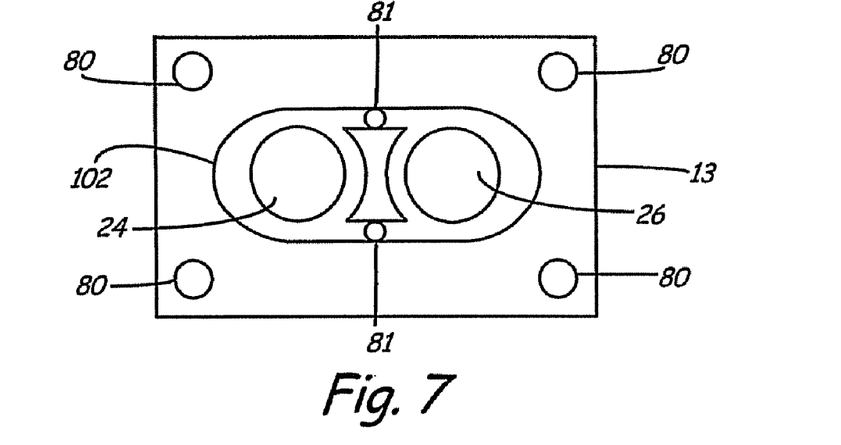
FIG. 7 is a top plan view of a gasket or seal formed of a single piece.

FIG. 7 is a top plan view of another example embodiment in which a single gasket or seal 102 is used which is arranged to fit around the two openings 24 and 26 and is held in alignment by bolt holes 81. In the above description, the gasket or seal 100 can comprise a traditional gasket material or can comprise a material which can be used to form a "confined gasket" such as PTFE.

Although either or both of the flange or sensor body may be made to have a curved profile, in some configurations it may be preferable that one or the other component be curved. For example, a small modification to the flange can be used to retrofit with existing transmitter bodies. On the other hand, in some configurations, it may be easier to machine the sensor body 14 into a desired shape. In addition to machining, the flange 13 or the transmitter body may also be cast in a manner to have a desired profile. Although gentle curved profiles are shown, the present invention may use any desired profile, and the profile may not be uniform across the surface of a particular face. This can be arranged to more evenly distribute the mounting force between the flange and the pressure transmitter. Although bolts are shown as applying the loading (mounting) force, any mounting technique may be employed. Further, although four bolts are shown at the four corners of the flange and the transmitter body, any number of bolts or mounting apparatus may be used and arranged as desired. In some configurations, this may also eliminate the need for additional center line bolts which are located near the center of the flange and provide assist in more evenly distributing the coupling force. As used herein, "flange" refers to any component used in coupling a pressure transmitter to a process fluid and is not limited to the particular flange configurations shown herein. Further, although two pressure couplings are illustrated, the present invention may be used with any number of pressure couplings for a pressure transmitter.

Although the present invention has been described with reference to preferred embodiments, workers skilled in the art will recognize that changes may be made in form and detail without departing from the spirit and scope of the invention.

What is claimed is:

1. A pressure transmitter for measuring a pressure of a process fluid in an industrial process, comprising:
    a pressure sensor having an output related to an applied pressure;
    measurement circuitry coupled to the pressure sensor configured to provide a transmitter output related to the applied pressure;
    a pressure coupling face having an opening therein arranged to transfer the applied pressure to the pressure sensor; and
    a pressure coupling flange having a flange face abutting the pressure coupling face configured to convey the process fluid to the opening of the pressure coupling face; and wherein at least one of the pressure coupling face and the flange face is curved in an outward direction and toward the other of the pressure coupling face and the flange face.

2. The pressure transmitter of claim 1 including an attachment mechanism configured to apply a mounting force between the pressure coupling flange and the planar pressure coupling face.

3. The pressure transmitter of claim 2 wherein a sufficient mounting force urges the at least one of the pressure coupling face and the flange face to conform to the other of the at least one of the pressure coupling face and the flange face.

4. The pressure transmitter of claim 2 wherein the curvature causes the mounting force to be substantially evenly distributed across an area of an interface between the pressure coupling face and the flange face.

5. The pressure transmitter of claim 1 wherein the at least one of the pressure coupling face and the flange face comprises the flange face.

6. The pressure transmitter of claim 1 the wherein at least one of the pressure coupling face and the flange face comprises the pressure coupling face.

7. The pressure transmitter of claim 1 wherein the at least one of the pressure coupling face and the flange face comprises the flange face and the pressure coupling face.

8. The pressure transmitter of claim 2 wherein the at least one of the pressure coupling face and the flange face is substantially planar when loaded with the mounting force.

9. The pressure transmitter of claim 2 wherein the curve is in a direction of the mounting force applied to the at least one of the pressure coupling face and the flange face.

10. The pressure transmitter of claim 9 wherein the mounting force is applied proximate edges of the at least one of the pressure coupling face and the flange face.

11. The pressure transmitter of claim 10 wherein the attachment mechanism is arranged proximate each of four corners of the flange face and the pressure coupling face.

12. The pressure transmitter of claim 11 wherein the attachment mechanism comprises four bolts.

13. A method of coupling a pressure transmitter for measuring a pressure of a process fluid to an industrial process, comprising:
    receiving an applied pressure at a pressure sensor in the pressure transmitter;
    coupling a pressure coupling flange having a flange face to a pressure coupling face of the pressure transmitter, wherein the flange face abuts the pressure coupling face, the pressure coupling flange configured to convey a process fluid to an opening of the pressure coupling face; and
    providing a curvature to at least one of the pressure coupling face and the flange face, the curvature in an outward direction and toward the other of the pressure coupling face and the flange face.

14. The method of claim 13 applying a mounting force between the pressure coupling flange and the planar pressure coupling face.

15. The method of claim 14 wherein the curvature causes the mounting force to be substantially evenly distributed across an area of an interface between the planar pressure coupling face and the flange face.

16. The method of claim 13 wherein at least one of the pressure coupling face and the flange face comprises the flange face.

17. The method of claim 13 wherein at least one of the pressure coupling face and the flange face comprises the pressure coupling face.

18. The method of claim 13 wherein at least one of the pressure coupling face and the flange face comprises the flange face and the pressure coupling face.

19. The method of claim 14 wherein the at least one of the pressure coupling face and the flange face is substantially planar when loaded with the mounting force.

20. The method of claim 14 wherein the curvature is in a direction of the mounting force applied to the at least one of the pressure coupling face and the flange face.

21. The method of claim 14 wherein the mounting force is applied proximate edges of the at least one of the pressure coupling face and the flange face.

22. A pressure coupling flange configured to couple to a pressure coupling face of a pressure transmitter, the pressure transmitter for measuring a process fluid, the pressure coupling flange comprising:
    at least one passageway formed therethrough configured to convey a process pressure through the flange and to the pressure coupling face of the pressure transmitter;
    a flange face configured to abut the pressure coupling face of the pressure transmitter and form a seal with the pressure transmitter around the at least one passageway; and
    a curvature in the flange face which is convex relative to the pressure coupling face whereby edges of the flange face are spaced apart from the pressure coupling face when in an unloaded condition and the flange face is substantially planar when a mounting force is applied against the pressure coupling face of the pressure transmitter.

23. The pressure coupling flange of claim 22 wherein curvature causes the mounting force to be substantially evenly distributed across an area of an interface between the pressure coupling face and the flange face.

24. The pressure coupling flange of claim 22 including a plurality of bolt holes arranged proximate edges of the flange configured to receive a plurality of bolts therethrough which apply the mounting force to the flange.

25. A pressure transmitter for measuring a pressure of a process fluid in an industrial process, comprising:
    a pressure sensor having an output related to an applied pressure;
    measurement circuitry coupled to the pressure sensor configured to provide a transmitter output related to the applied pressure;
    a pressure coupling face having an opening therein arranged to transfer the applied pressure to the pressure sensor; and
    a pressure coupling flange having a flange face abutting the pressure coupling face configured to convey the process fluid to the opening of the pressure coupling face; and
    a seal positioned between the pressure coupling face and the flange face having a feature arranged to alter a distribution of a loading force applied between the pressure coupling face and the flange face.

26. The pressure transmitter of claim 19 including an attachment mechanism configured to apply a mounting force between the pressure coupling flange and the planar pressure coupling face.

27. The pressure transmitter of claim 25 wherein the mounting force is applied proximate edges of the at least one of the pressure coupling face and the flange face.

28. The pressure transmitter of claim 27 wherein the attachment mechanism is arranged proximate each of four corners of the flange face and the pressure coupling face.

29. The apparatus of the claim 25 wherein the feature comprises a bevel.

30. The apparatus of the claim 25 wherein the feature comprises a variable area.

31. The apparatus of claim 25 including first and second openings extending through the flange to the pressure coupling face and wherein the seal extends around the first and second openings.

32. The apparatus of claim 31 wherein the seal is aligned with at least one bolt hole in the flange.

33. The apparatus of claim 25 wherein the seal comprises a confined gasket.

34. A method of coupling a pressure transmitter for measuring a pressure of a process fluid to an industrial process, comprising:
receiving an applied pressure at a pressure sensor in the pressure transmitter;
coupling a pressure coupling flange having a flange face to a pressure coupling face of the pressure transmitter, wherein the flange face abuts the pressure coupling face, the pressure coupling flange configured to convey a process fluid to an opening of the pressure coupling face; and
placing a seal between the pressure coupling flange and the pressure coupling face which has a feature for evenly distributing a loading force applied between the flange face and the pressure coupling face when a loading force is applied therebetween.

35. The method of claim 34 including applying a mounting force between the pressure coupling flange and the planar pressure coupling face.

36. The method of the claim 34 wherein the feature comprises a bevel.

37. The method of the claim 34 wherein the feature comprises a variable area.

38. The method of claim 34 including providing first and second openings extending through the flange to the pressure coupling face and wherein the seal extends around both the first and second openings.

39. The method of claim 34 wherein the seal is aligned with at least one bolt hole in the flange.

40. The method of claim 39 wherein the seal comprises a confined gasket seal.

* * * * *